United States Patent [19]

Lurois

[11] Patent Number: 5,896,905
[45] Date of Patent: *Apr. 27, 1999

[54] TREAD FOR HEAVY-VEHICLE TIRE IN WHICH THE CENTRAL RIBS ARE PROVIDED WITH INCLINED INCISIONS

[75] Inventor: Patrick Lurois, Cebazat, France

[73] Assignee: Compagnie Generale Des Establissements, Michelin, France

[*] Notice: This patent issued on a continued prosecution application filed under 37 CFR 1.53(d), and is subject to the twenty year patent term provisions of 35 U.S.C. 154(a)(2).

[21] Appl. No.: 08/432,897

[22] Filed: May 2, 1995

Related U.S. Application Data

[63] Continuation of application No. 07/473,578, Feb. 1, 1990.

[30] Foreign Application Priority Data

Feb. 22, 1989 [FR] France ................................ 89/02381

[51] Int. Cl.$^6$ .................................................... B60C 11/12
[52] U.S. Cl. .................... 152/209.23; 152/209.14; 152/900; 152/DIG. 3
[58] Field of Search ...................... 152/209 R, 209 D, 152/DIG. 1, DIG. 3, 209.23, 209.14, 900

[56] References Cited

U.S. PATENT DOCUMENTS

| | | | |
|---|---|---|---|
| 2,197,662 | 4/1940 | Hughes | 152/209 R |
| 2,240,542 | 5/1941 | Bourdon | 152/209 R |
| 2,779,060 | 1/1957 | Knox | 152/DIG. 3 |
| 3,782,438 | 1/1974 | Mirtain | 152/209 R |
| 4,298,046 | 11/1981 | Herbelleau et al. | 152/209 R |
| 4,705,088 | 11/1987 | Ghilardi | 152/209 R |
| 4,836,257 | 6/1989 | Mamada et al. | 152/209 R |

FOREIGN PATENT DOCUMENTS

| | | | |
|---|---|---|---|
| 0292563 | 11/1988 | European Pat. Off. . | |
| 1452048 | 9/1966 | France | 152/209 R |
| 2317112 | 7/1975 | France . | |
| 2418719 | 3/1978 | France . | |
| 727207 | 3/1955 | United Kingdom | 152/209 R |
| 2053817 | 2/1981 | United Kingdom . | |
| 2093777 | 9/1982 | United Kingdom . | |

OTHER PUBLICATIONS

Patent Abstracts of Japan, vol. 7, No. 217 (M-245) |1362|, Sep. 27, 1983; JP-A-58 112 805 (Yokohma Gomu K.K.) May 7, 1983.

*Primary Examiner*—Geoffrey L. Knable
*Attorney, Agent, or Firm*—Baker & Botts, LLP

[57] ABSTRACT

In order to improve the wear of the trailing edges of the relief elements of a tread (1) for "heavy vehicle" tires, which elements are defined in the axial direction by circumferential grooves and in the circumferential direction by incisions (30) of a width other than zero and at most equal to 3 mm, said incisions (30) are inclined with respect to the normal (P) to the surface of the tread by an angle α of between 5° and 25° so that the resultant force ($F_F$, $F_M$) exerted by the ground on the tread tends to straighten the incisions (30) towards a zero inclination. The inclination of the incisions (30) is particularly advantageous in the case of a tread (1) provided with "wide" circumferential grooves having a step (4). Application for steering, load-bearing or driving tires.

13 Claims, 5 Drawing Sheets

TREAD FOR HEAVY-VEHICLE TIRE IN WHICH THE CENTRAL RIBS ARE PROVIDED WITH INCLINED INCISIONS

This application is a continuation of application Ser. No. 07/473,578, filed on Feb. 1, 1990.

BACKGROUND OF THE INVENTION

The present invention refers to new or recapped treads for tires with radial carcass reinforcement intended for use on transport vehicles and more particularly "heavy vehicles" which are intended to make long trips at sustained speed.

Such conditions of travel require high inflation pressures which, measured cold, are greater than 5 bars.

In addition to the radial carcass reinforcement, these tires comprise a crown reinforcement formed of at least two superimposed plies of cables of little extensibility, preferably of steel, crossed from one ply to the next and forming angles of at most 40° with the circumferential direction. The tread reinforcement may advantageously be supplemented, on the one hand, by two half-plies formed of cables of little extensibility which form an angle of between 45° and 80° with the circumferential direction and, on the other hand, by one or more plies formed of elastic cables placed radially outward of the two crown plies of cables of little extensibility, and forming a small angle with the circumferential direction.

The crown reinforcement is surmounted by a tread which generally comprises a plurality of circumferential grooves, which have traces of linear, broken or undulated lines. These circumferential grooves have either identical or different widths. In the latter case, certain wide grooves are combined on the same tread with narrower grooves, the width of which, measured on the tread with the tire mounted on its operating rim and inflated to its rated pressure, may be such that, under the effect of the load imposed on the tire, the two quasi-vertical walls of these grooves may come into contact over all or part of their height.

Such treads are described in French Patent 1 452 048. FIG. 1 of said patent shows a tread having four wide circumferential grooves, while FIGS. 2 and 3 show treads having two wide circumferential grooves which cooperate with three or four circumferential grooves of smaller width.

In order to improve the longitudinal adherence of said treads, it is known to provide for the presence of transverse grooves the average orientation of which is between 45° and 80° with respect to the circumferential direction of the tire. In the case of the "heavy vehicle" tires in question, these transverse grooves generally have small widths of less than 3 mm which therefore may be referred to as incisions. These incisions, the traces of which may be linear, a broken line or an undulated line, either assure the connection between two circumferential grooves or originate within a circumferential groove and debouch onto a single circumferential groove or do not debouch on any circumferential groove, as shown in French Patent 1 452 048. The incisions which debouch on the two grooves defining a rib are by far the most effective in adherence, but on the other hand give rise to a very special irregular form of wear. The wear appears and develops more rapidly on the surface located on the side of the trailing edge of the relief element defined by the two circumferential grooves and the two transverse incisions than on the surface located on the side of the other edge, that is to say, the leading edge.

By definition, the leading edge of a relief element is the edge which penetrates first into the surface of contact between the tire and the ground, the tire obviously having a given direction of rotation, and the trailing edge therefore penetrating into the contact surface after the leading edge.

This form of wear is all the more disturbing as it affects the relief elements located on the ribs of the tread which are between two circumferential grooves and more particularly the ribs defined in the axial direction by two grooves of different width.

SUMMARY OF THE INVENTION

The invention proposes to remedy the irregular form of wear described above and accordingly to improve the wear life of the tread while retaining good road-holding ability of the tire with respect to viscoplaning and hydroplaning.

In accordance with the invention, a tread for a heavy vehicle tire with radial carcass reinforcement surmounted by a crown reinforcement and comprising circumferential grooves so as to provide the tread with at least five ribs, these ribs being provided with incisions of a width other than zero and less than 3 mm which are transverse and substantially parallel to each other, spaced circumferentially by a pitch of between 0.005 and 0.013 times the circumferential length of the tire, measured in the equatorial plane, is characterized by the fact that at least the ribs defined by two circumferential grooves are provided with incisions which debouch on the two grooves, inclined by an angle between 5° and 25° with respect to the direction perpendicular to the tread so that the resultant force exerted upon travel in the ellipse of contact by the ground on the tread tends to straighten the incisions toward a zero inclination with respect to said perpendicular to the tread, the latter having, in the axial portion thereof contained between the two axially outermost grooves, an average radius of transverse curvature at least equal to 50% of the equatorial radius of curvature of the tire mounted on the normal operating rim, inflated to its rated pressure.

The "heavy vehicle" tires are mounted either on the steering axle of the vehicle or on a driving axle, these two axles being also load-bearing axles, or on an axle which is merely a load-bearing axle. In the case of mounting on a steering axle or on only a load-bearing axle, that is to say, a non-driving axle the resultant force exerted by the ground on the tread is a braking force, that is to say the direction of which is opposite to that of the direction of travel of the vehicle. In the case of mounting on the driving axle, the resultant force exerted by the ground is the driving force, that is to say a force the direction of which is identical to that of the travel of the vehicle.

Depending on the use to be made of the tire, the inclination claimed is a function of the force exerted in the ellipse of contact and the direction of rotation is then imposed upon the tire:

It is known from French Patents 2 418 719 and 2 461 602 to provide the elements in relief of a tread, defined by circumferential grooves and by quasi-transverse grooves, with incisions of a width other than zero which are very close to each other and inclined with respect to the direction perpendicular to the tread, the inclination of the incisions being described in said patents as necessary for the forming and self-maintaining of the irregular wear of the slices of rubber between adjacent incisions.

The direction of inclination is then selected in such a manner that the tangential stresses of the ground on the tread accentuate the inclination and therefore the preferential irregular wear of the slices of rubber.

In the case of a "heavy vehicle" tire travelling under normal or rated conditions of travel (load, pressure) and provided with a tread such as described above, the inclination of the incisions, delimiting by themselves the elements in relief which have a great circumferential length as compared with the distance between two adjacent incisions claimed in said patents, permits a considerable decrease in the forces exerted by the ground on the trailing edges of the elements in relief, and brings it about that the ratio of the resultant of these forces on the load borne by the element remains for as long as possible less than the coefficient of adherence of the tread. The actual slippage between the ground and the tread is thus decreased and, accordingly, the appearance of wear of the trailing elements of the edges in relief.

In the case of a tire intended for use on a steering axle or on a merely load-bearing axle, it is preferable to apply the invention to a tread comprising at most two wide circumferential grooves associated with relatively narrow grooves. These grooves are defined by two ribs and a rib having two walls of either identical or different height. Within the scope of the invention there is to be understood by wide groove, a groove the width of which, measured on the tread of a tire mounted on its operating rim and inflated to the recommended pressure, is greater than 1.7 times the square root of the height of the largest wall. A groove will be referred to as "narrow" if its width is less than 1.2 times the square root of the height of the largest wall. The two wide grooves are preferably spaced axially apart by at most 0.45 times the width of the tread and are located symmetrically on either side of the equatorial line of the tire.

Still in the case of a tire intended for use on a steering or simply load-bearing axle, the invention is particularly advantageous for a tire provided with a tread comprising a single wide circumferential groove located at the center of the tread and at least four narrow grooves located on opposite sides of the said central groove, the widths of these grooves satisfying the above definitions. Such a tread configuration is described in French Patent 1 584 734. The application of the invention to this type of tread then permits a substantial improvement in the wear, the loss in weight per kilometer being even less than when the tread has two wide grooves, the effect produced by these incisions in accordance with the invention being then superior to the same effect produced in the case of a tread having two wide grooves.

Whatever the type of tread used, the effect produced by the incisions in accordance with the invention is considerably and advantageously accentuated by the presence in the wide groove(s) of non-incised step(s) or beads in relief, the height of which is between 90% and 50% of the height of the wide groove(s), the two grooves created between the walls of the ribs and the walls of a step having an axial width at most equal to 35% of the width of the wide groove.

It is likewise advantageous, in accordance with the invention, to provide the elements in relief, in the region of the tread contained between the two grooves axially furthest from the center, with a trailing edge which is raised radially as compared with the leading edge by a height at most equal to 25% of the height of the wall defining the leading edge of the element in relief. In the case of treads of the type in question, the difference in height between the wall of the leading edge and the wall of the trailing edge is at most equal to 4.5 mm.

This difference in height, in the case of an element in relief contained between two narrow grooves, is advantageously constant over the entire width of the element in relief. In the case of an element in relief contained between a narrow groove and a wide groove, whether or not provided with a step, this difference in height is advantageously variable, being larger on the side of the wide groove.

If one considers the length of the element in relief, this dimension being measured in the circumferential direction, this difference in height decreases uniformly from the trailing edge to the leading edge as a function of the circumferential distance or may decrease in any other manner, for instance remain constant over a circumferential distance at most equal to 50% of the length of the element in relief and then decrease linearly over the remaining circumferential distance.

It is likewise advantageous, whatever the type of tread in accordance with the invention, radially to lower the ribs of the edges of the tread with respect to the closest axially inner ribs, the axially outer wall of the narrow rib axially furthest from the center having a smaller height than the axially inner wall, the difference being between 0.05 and 0.50 times the height of the axially inner wall.

DESCRIPTION OF THE DRAWINGS

The drawings and the part of the description referring thereto illustrate examples of the application of the invention. In the drawings.

DESCRIPTION OF THE INVENTION

Figure 1:
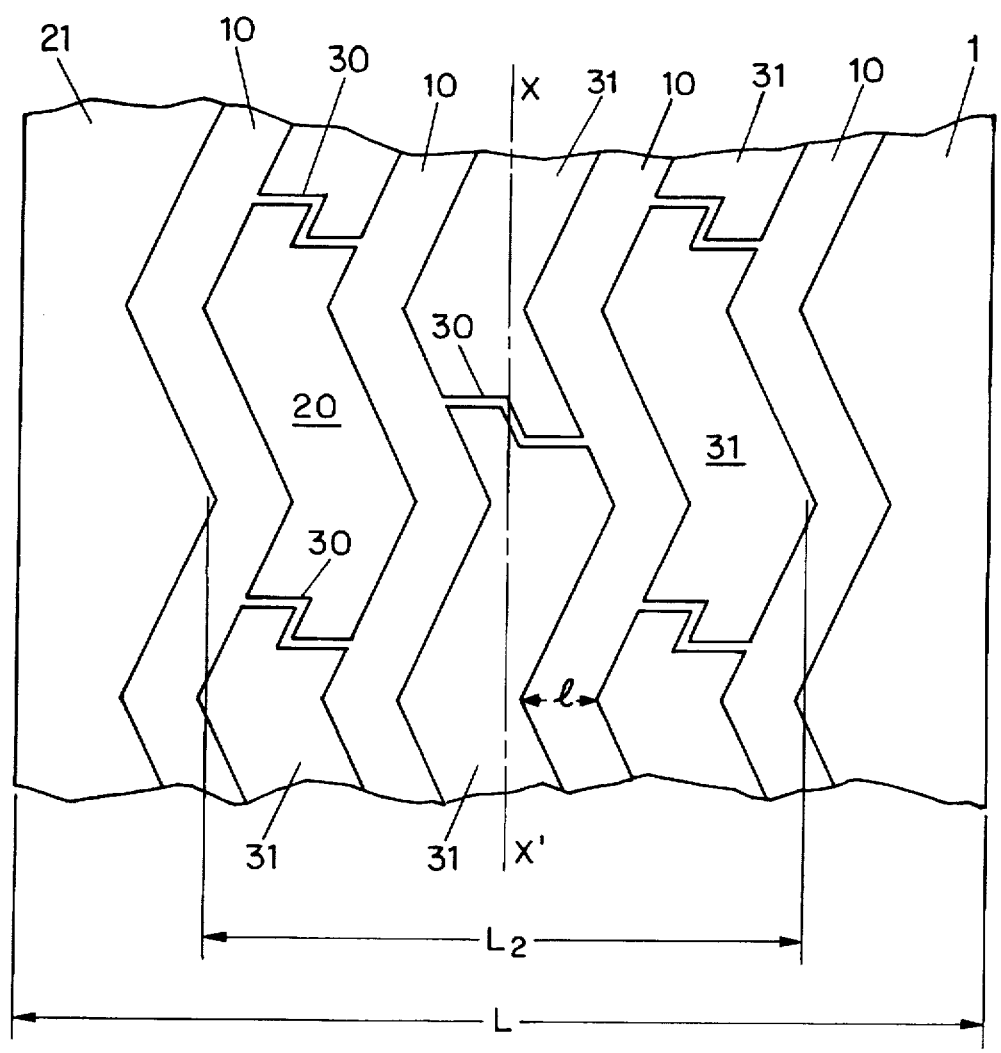
FIG. 1 is a plan view of a portion of tread for a "heavy vehicle" tire in accordance with the invention.

The tread 1 of width L of FIG. 1 comprises four relatively wide circumferential grooves 10 of width "1" equal to 10 mm, the depth $h_1$ of grooves (FIG. 4) being 14 mm. These grooves 10 define with each other five ribs. The three central ribs 20 are provided with incisions 30 while the two ribs 21 on the edges of the tread are not.

These incisions 30 are transverse and substantially parallel to each other. The term transverse incisions, as used herein, means incisions the direction of which on the tread forms an angle at least equal to 50° with the circumferential direction. They are parallel to each other when their directions differ only by an angle of at most 10°. They have a width of 0.6 mm.

Figure 4:
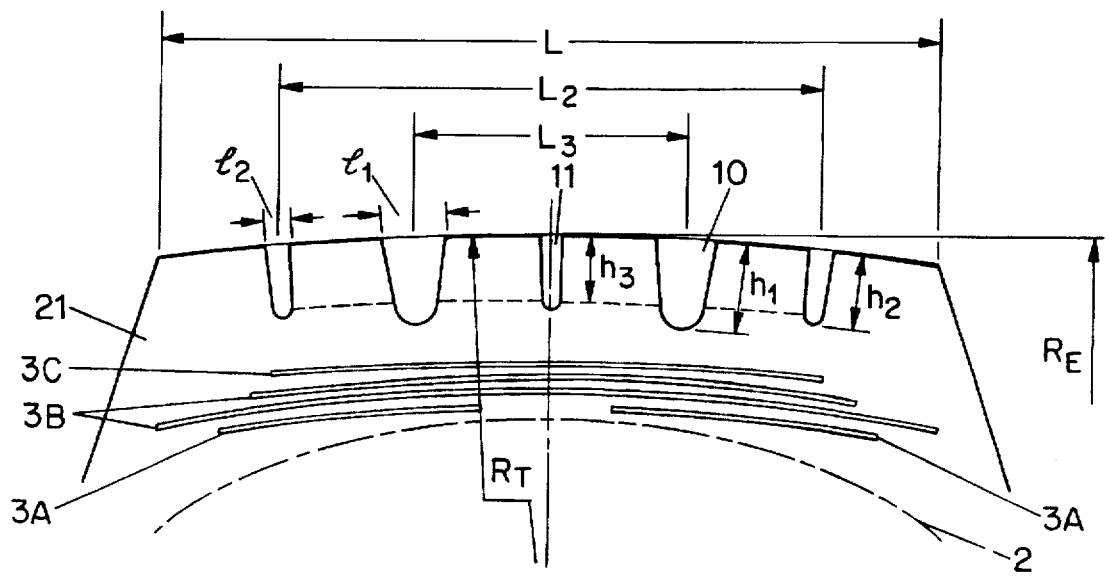
FIG. 4 is a section view along the line AA of FIG. 3.

The axial distance $L_2$ between the two axially outermost grooves is equal to 65% of the width L of the tread. The average transverse radius $R_T$ of this region of width $L_2$ is equal to 80% of the equatorial radius $R_E$ measured in the equatorial plane, the trace of which is XX' (FIG. 4).

The diagrams 2A and 2B show the direction of inclination of the incisions 30 for non-driving and drive axles, respectively. They are all inclined with respect to the direction P perpendicular to the tread 1 by an angle a equal to 7° in the case considered.

Figure 2A:
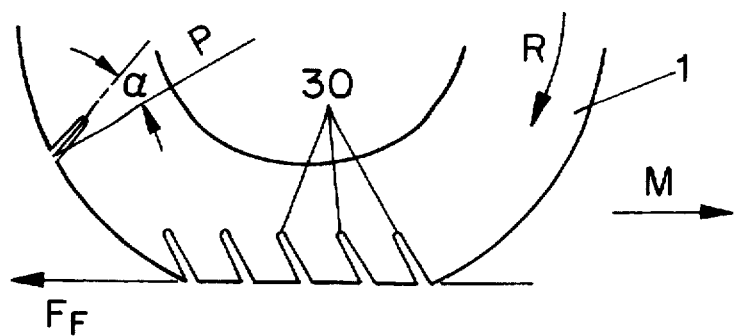
FIGS. 2A and 2B are diagrams showing the inclination of the incisions as a function of the resultant force exerted in the ellipse of contact between the tire and the ground.

If M designates the direction of forward travel of the equipped vehicle and F the resultant force exerted by the ground on the tread in the contact ellipse, the inclinations 30 are inclined in such a manner that the force F tends to move the incisions towards zero inclination, the force F acting on the surfaces of the relief elements 31 in contact with the ground as shown in diagram 2A in which the force F is a braking force FF the direction of which is opposite to the direction of travel of the vehicle and the tire is therefore a load-bearing tire, whether or not a steering tire, on which one can then provide an arrow indicating the direction of rotation R imposed on the tire. In FIG. 2A the incisions are all inclined with respect to a direction perpendicular to the tread in a direction of inclination which is opposite to the prescribed forward direction of rotation of the tire.

If the force F is a driving force $F_M$ (FIG. 2B), that is to say, a force having the same direction as the direction of travel, the incisions 30 are inclined in the direction opposite to the incisions of FIG. 2A. The tire is used on a drive axle of the vehicle and has an imposed direction of rotation R.

Figure 3:
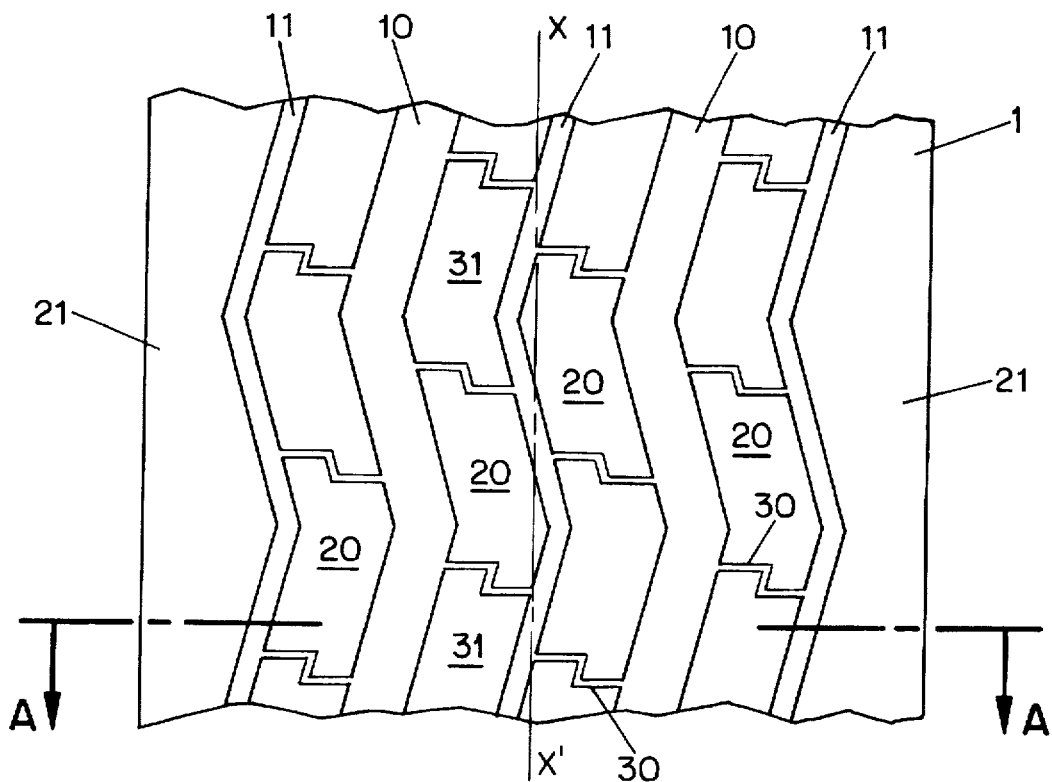
FIG. 3 is a plan view of a portion of a tread for the same type of tire in accordance with a first variant pursuant to the invention.

The tread 1 of width L of FIG. 3 comprises only two relatively wide circumferential grooves 10 of the same width $l_1$ of 10 mm as previously for a depth $h_1$ of 14 mm. These grooves 10 are in this example spaced axially by a width $L_3$ at most equal to 0.45 L. On both sides of these grooves 10 there are narrow grooves 11, the width $l_2$ of which is equal to 3.5 mm. These wide grooves 10 and these narrow grooves 11 define with each other six ribs. The four central ribs 20 are provided with incisions 30 of the same type as in the case of FIG. 1 while the two ribs 21 of the edges of the tread are not.

FIG. 4 is a partial view in section along the line AA of FIG. 3 of the crown of the tire. The radial carcass reinforcement 2 is surmounted by a crown reinforcement 3 formed essentially of two triangulation half-plies 3A of metal cables of little extensibility and form an angle of 65° with the circumferential direction, of two working plies 3B of metal cables of little extensibility crossed from one ply to the next and oriented with respect to the same circumferential direction by an angle at most equal to 40°, these two plies 3B being surmounted radially by a ply 3C of elastic cables oriented substantially at the same angle as the cables of the plies 3B. As to the respective depths $h_1$, $h_2$, $h_3$ of the wide grooves 10, of the narrow grooves 11 and of the incisions 30, they are such, in the case shown, that $h_1$ is slightly greater than $h_2$, which itself is slightly greater than $h_3$. The differences are of the order of 2 mm in the case of the type of tire considered.

Figure 6:
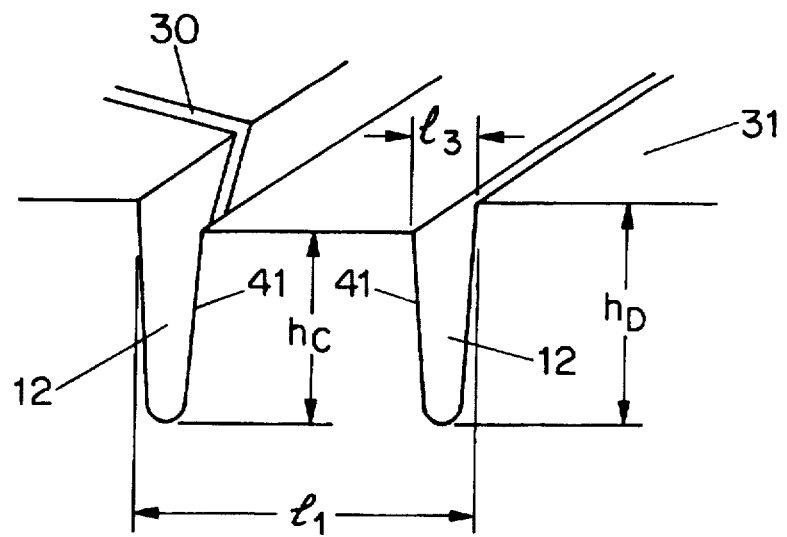
FIG. 6 is a detail view in section along the line AA of FIG. 5.
Figure 5:
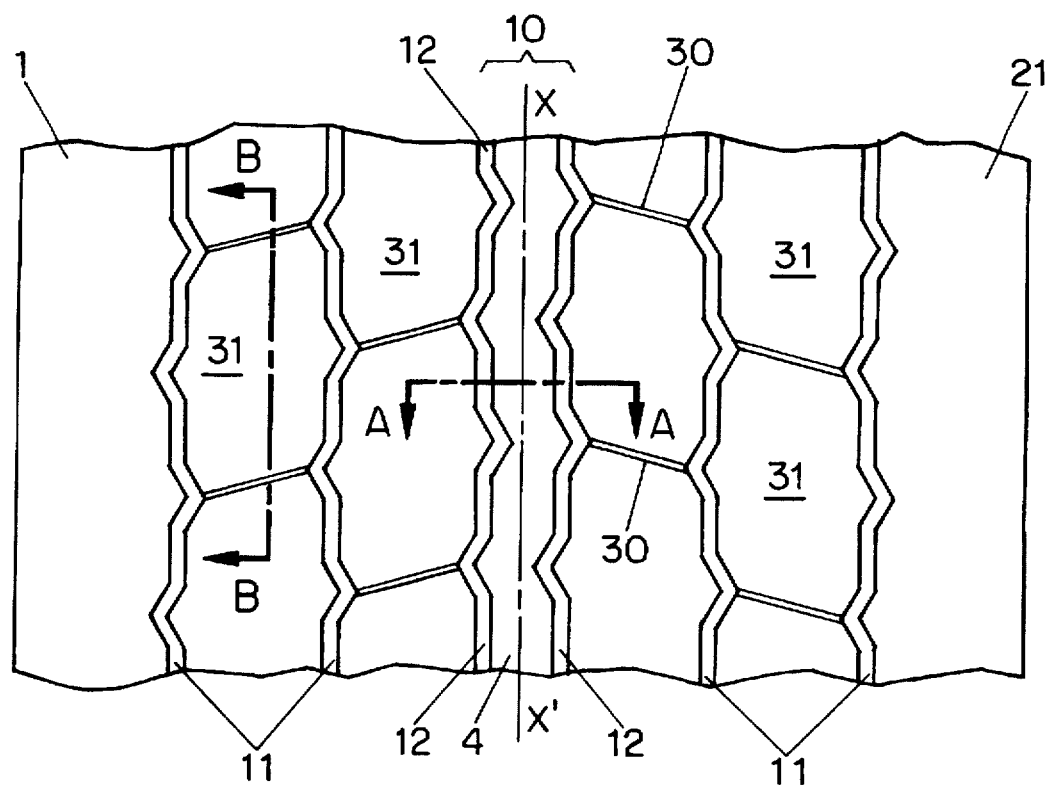
FIG. 5 is a plan view of a portion of a tread according to a second variant embodiment.

FIG. 5 shows a second variant of a tread in accordance with the invention. The tread 1 shown in this figure has only a single wide circumferential groove 10 of 12 mm and, located symmetrically on opposite sides of this groove, four narrow grooves 11 of 4 mm. Incisions 30 cut the ribs created into elements in relief 31. The detail shown in this figure concerns the presence of a step 4 in the wide circumferential groove 10 of the center of the tread 1. As shown in FIG. 6, the walls 41 of this step 4 form, with the walls of the elements in relief 31 adjacent the central groove 10, grooves 12 whose width $l_3$ is equal to 0.20 times the width $l_1$ of the wide groove, namely 2.4 mm. The height $h_C$ of the axially inner walls 41 of the grooves 12 is less than the height $h_D$ of 18 mm of the axially outer walls of the same grooves, such that the difference $h_D-h_C$ is equal to 20% of $h_D$. The above characteristics of such a step make it possible to minimize the transverse movements of the elements in relief 31 while permitting sufficient removal of water in the case of a "heavy vehicle" tire, which, due to its inflation pressure and therefore the contact pressure between the ground and the tread, is little sensitive to the phenomenon of hydroplaning under the conditions of speed usually employed.

Figure 7:
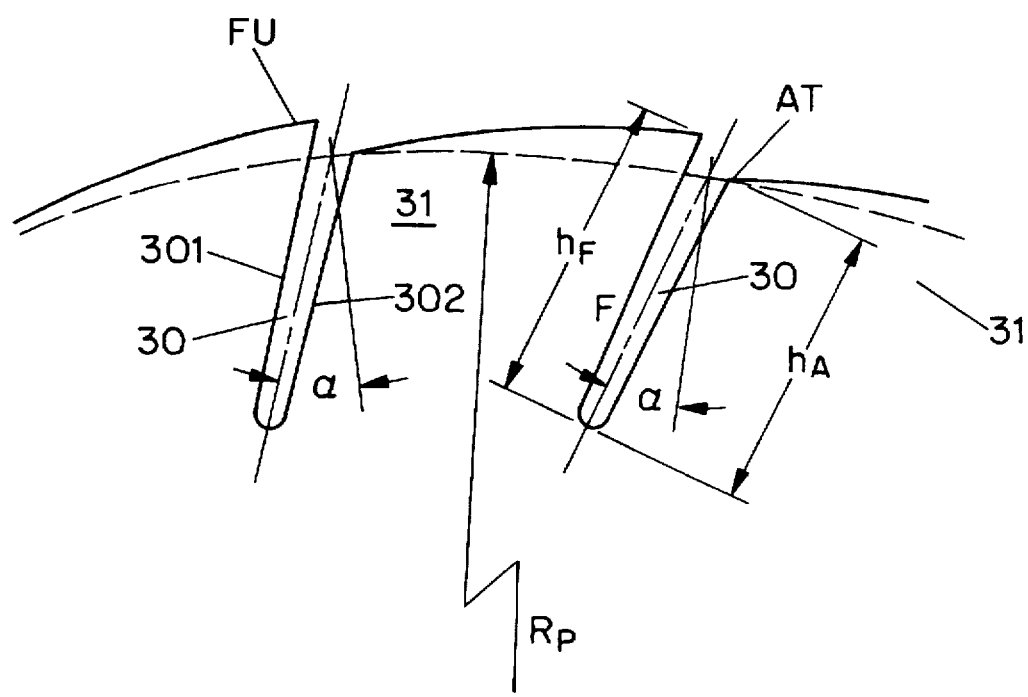
FIG. 7 is a detail view in section along the line BB of FIG. 5 in accordance with a preferred variant.

FIG. 7 shows a third feature which, in combination with the inclination of the incisions and the presence of a step in the wide grooves, improves the resistance of the elements in relief to their regular wear in question. Applied to a tread such as shown in FIG. 5 and along a longitudinal section BB, this feature consists in raising the trailing edges as compared with the leading edges, the height $h_F$ measured parallel to the direction of the incision 30 of the wall 301 on the trailing edge FU side of the element in relief 31 being greater than the height $h_A$ of the wall 302 on the leading edge AT of the adjacent element in relief 31, the difference $h_F-h_A$ being between 1 mm and 4.5 mm for the tires in question.

Figure 8:
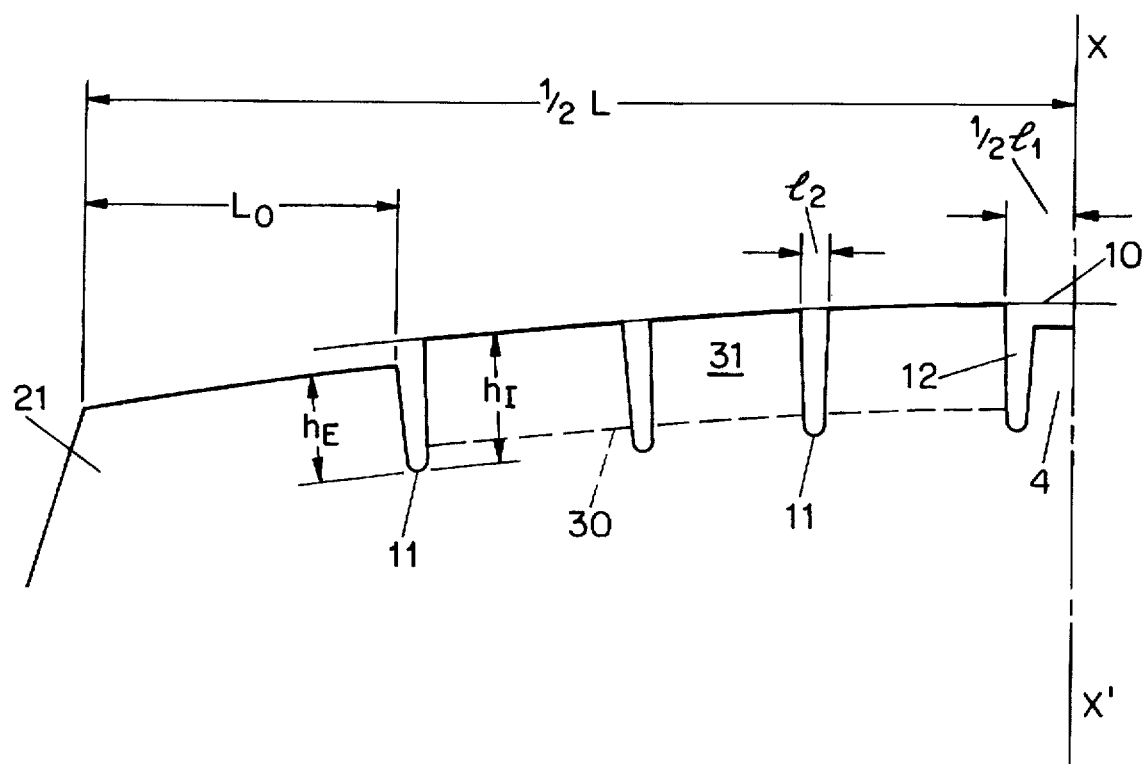
FIG. 8 is a view in radial section of another variant in accordance with the invention.

FIG. 8, a view in cross-section of a half-tread, shows a preferred variant relating to the structure of the rib 21 on the side of the tread 1. The latter has no incisions 30 and has a width Lo at least equal to 13% of the width L of the tread, which width is greater than the width of a relief element 31 due to the presence, in addition to the central groove 10 provided with a step 4, of 3 narrow grooves 11 located on the same side of the groove 10. Furthermore, the rib 21 is lowered with respect to the axially adjacent element in relief 31, the axially outer height $h_E$ of the groove 11 furthest axially from the axis XX' being smaller than the axially inner height $h_I$ of the same groove 11, the difference $h_I-h_E$ being between 0.5 mm and 5 mm for the sizes of tires in question.

The treads described above were subjected to wear tests carried out on 295/80 R 22.5 tires with radial carcass reinforcement, inflated to their rated pressure of 8 bars. These tests were carried out on "heavy vehicles" travelling on a highway type circuit, that is to say with very few curves, at an average speed of 90 kilometers per hour.

The results obtained and which are given by way of example for steering tires, since these are most sensitive to the phenomenon in question, are described in tabular form. Table I shows, on the one hand, the wear rates, that is to say the average loss in weight per $10_3$ kilometers travelled, considering as base 100 the loss of weight obtained with a tire equipped with a tread having two wide grooves and three narrow grooves, without incisions, and on the other hand the number of kilometers travelled by the tire in order for the irregular wear of the trailing edge to be considered apparent and harmful.

This irregular wear is measured by the difference in height between the leading edge of an element in relief and its trailing edge, and a difference in height of 2 mm is considered to be harmful irregular wear.

Table II shows the influence of the presence of a step in combination with the inclination of the incisions, in the case, for instance, of a tread having a single wide groove.

TABLE I

| Nature of Incisions Type of tread | No Incision | Incision of 0° on 4 central ribs | Incisions inclined 7° on 4 central ribs |
| --- | --- | --- | --- |
| 2 wide grooves 3 narrow grooves | 100 | 120 35,000 km | 95 60,000 km |

TABLE I-continued

| Nature of Incisions Type of tread | No Incision | Incision of 0° on 4 central ribs | Incisions inclined 7° on 4 central ribs |
|---|---|---|---|
| 1 central groove | 75 | 97 | 60 |
| 4 narrow grooves | | 50,000 km | 120,000 km |

TABLE II

| | Step | |
|---|---|---|
| Incisions | With Step | Without Step |
| Incisions of 0° | 70,000 km | 50,000 km |
| Incisions of 7° | 180,000 km | 120,000 km |

Although these results suffer from a measurement dispersion on the order of 10%, they clearly show two facts, namely:

The inclination of the incisions has a much more powerful effect in the case of a tread with a single wide central groove; and whatever the tread, the inclination amply compensates by loss of weight for the loss due to the presence itself of incisions.

The presence of a step in the wide groove has a much more powerful effect in the case of inclined incisions than in the case of incisions of zero inclination with respect to the appearance of harmful irregular wear.

As to the increase in elevation of the trailing edges of the elements in relief as compared with their leading edges, the function of which is to improve the adherence potential of the trailing edges, it makes it possible to increase the mileage for the appearance of irregular wear to more than 200×10³ kilometers on the same highway circuit, in case of use in combination with the inclined incisions and the presence of a step.

Figure 2B:
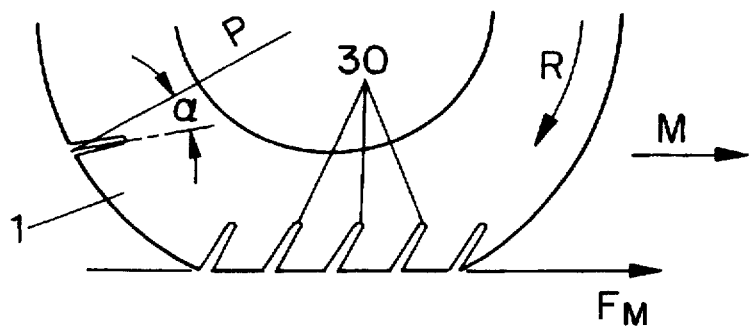

An incision is said to be inclined in the direction of rotation of the tire when the angle formed by the tread surface and the leading wall of the incision is an obtuse angle as shown in FIG. 2B. An incision is said to be inclined in the direction opposite to the direction of rotation of the tire when the angle formed by the tread surface and the leading wall of the incision is an acute angle as shown in FIG. 2A.

I claim:

1. A radial tire mounted on a non-driving axle of a medium or high load transport vehicle traveling long distances at sustained speed, with a prescribed direction of rotation in the forward direction of the vehicle, said tire having an operating pressure of inflation greater than 5 bars and embodying a radial carcass reinforcement surmounted by a crown reinforcement with a tread therearound, said tire comprising circumferential grooves in the tread defining at least five ribs between opposite tread edges, the transverse radius of curvature (RT) of such tread in its axial portion, contained between the two axially outermost grooves, being at least equal to 50% of the equatorial radius of curvature (RE) of the tire mounted on its nominal operating rim and inflated to the recommend pressure, incisions formed in one or more ribs of the tread, and every incision having a width other than zero and less than 3 millimeters and opening into each of the two adjacent grooves defining said rib, said incisions extending transversely of said rib substantially parallel to one another and being spaced circumferentially with a pitch between 0.005 and 0.013 times the circumferential length of the tire measured in the equatorial plane, and all of said incisions being inclined by an angle of between 5° and 25° with respect to the direction perpendicular to the tread in a direction of inclination which is opposite to the prescribed forward direction of rotation of the tire, whereby the resultant braking force (FF) exerted by the ground on the area of contact of the tire when operating on the non-driving axle tends to straighten the incisions towards a lesser angle of inclination with respect to said perpendicular to the tread and means on the tire for indicating the direction of rotation of the tire in operation on the non-driving axle for moving the vehicle in the forward direction, whereby said indicating means ensures the proper mounting of the radial tire on the non-driving axle.

2. A tire according to claim 1, having two wide circumferential grooves axially spaced apart by a width ($L_3$) at most equal to 0.45 L, L being the width of the tread, and located symmetrically on opposite sides of the equatorial line, and a plurality of circumferential narrow grooves, the width ($l_1$) of the wide grooves being greater than 1.7 times the square root of the height ($h_1$) of the largest wall of a wide groove and the width ($l_2$) of the narrow grooves being less than 1.2 times the square root of the height ($h_2$) of the largest wall of the narrow groove.

3. A tire according to claim 1, having a single wide groove located in the center of the tread, the wide groove having a width greater than 1.7 times the square root of the height ($h_1$) of the largest wall of such wide groove, and at least four narrow grooves, with two of the narrow grooves on each side of the central wide groove, said narrow grooves having a width less than 1.2 times the square root of the height ($h_2$) of the largest wall of such narrow groove.

4. A tire according to claim 1, wherein said grooves include a plurality of narrow grooves and at least one wide circumferential groove, the at least one wide circumferential groove having a width greater than 1.7 times the square root of the height ($h_1$) of the largest wall of the wide groove and being provided with at least one step in relief, the height ($h_c$) of such step being between 0.90 and 0.50 times the height ($h_D$) of the adjacent elements in relief, the heights ($h_c$) and ($h_D$) being measured with respect to the bottom of the circumferential grooves created by the walls of the step and the walls of the relief elements, each groove so created having an axial width ($l_3$) at most equal to 0.35 times the width ($l_1$) of the wide groove.

5. A tire according to claim 1, wherein the transverse incisions define, with the circumferential grooves, elements in relief, and the height ($h_F$) of the wall of each element in relief located on the trailing-edge (FU) side of the element being greater than the height ($h_A$) of the wall of the circumferentially adjacent element in relief located on the leading-edge side of the adjacent element, these two heights being measured parallel to the direction of the incisions and the difference ($h_F$–$h_A$) being at most equal to 25% of the height ($h_A$) located on the leading edge side.

6. A tire according claim 1, wherein the ribs at the edges of the tread are devoid of incisions, the heights ($h_E$) of the axially outer sidewalls of the circumferential grooves furthest axially from the equatorial axis being smaller than the heights ($h_I$) of the axially inner sidewalls of the same grooves, the difference ($h_I$–$h_E$) being between 0.05 and 0.50 times the axially inner height ($h_I$).

7. A tire with a radial carcass reinforcement surmounted by a crown reinforcement, intended to equip medium and high tonnage transport vehicles travelling long distances at sustained speed and to be inflated at a pressure greater than 5 bars, comprising a single wide circumferential groove (10) located in the center of the tread and at least four narrow grooves (11), at least two being located on each side of the central wide groove, so as to provide the tread with at least six ribs, the width ($l_1$) of the wide groove being greater than 1.7 times the square root of the height ($h_1$) of the largest wall of the wide groove and the width ($l_2$) of a narrow groove being less than 1.2 times the square root of the height ($h_2$) of the largest wall of the narrow groove, which ribs can be provided with incisions of a width other than zero and less than 3 mm which are transverse and substantially parallel to each other, spaced circumferentially by a pitch of between 0.005 and 0.013 times the circumferential length of the tire measured in the equatorial plane, wherein at least the ribs (20) defined by two circumferential grooves are provided with incisions (30) debouching on the two grooves, all such incisions in the tread being inclined in the same direction by an angle α of between 5° and 25° with respect to the direction perpendicular (P) to the tread, the direction being such that the resultant force (F) exerted upon travel on the ellipse of contact by the ground on the tread (1) tends to straighten the incisions (30) towards a zero inclination with respect to said perpendicular (P) to the tread (1), the tread having in its axial portion, contained between the two axially outermost grooves, a transverse radius of curvature ($R_T$) at least equal to 50% of the equatorial radius of curvature ($R_E$) of the tire mounted on its nominal operating rim and inflated to the recommended pressure.

8. A tire according to claim 1, wherein the wide circumferential groove is provided with one or more steps in relief (4), not incised, the height ($h_c$) of which is between 0.90 and 0.50 times the height ($h_D$) of the adjacent elements in relief (31), the heights ($h_c$) and ($h_D$) being measured with respect to the bottom of the circumferential grooves (12) created by the walls (41) of the step (4) and the walls of the relief elements (31), each groove (12) so created having an axial width ($l_3$) at most equal to 0.35 times the width ($l_1$) of the wide groove (10).

9. A tire according to claim 7, wherein the transverse incisions define, with the circumferential grooves, elements in relief (31), the height ($h_F$) of the wall (301) of each element in relief (31) located on the trailing-edge (FU) side of the element is greater than the height ($h_A$) of the wall (302) of the circumferentially adjacent element in relief located on the leading-edge side of the adjacent element, these two heights being measured parallel to the direction of the incisions and the difference ($h_F-h_A$) being at most equal to 25% of the height ($h_A$).

10. A tire according to claim 1, wherein the ribs (21) at the edges of the tread (1) do not have incisions (30) and the heights ($h_E$) of the axially outer sidewalls of the circumferential grooves furthest axially from the equatorial axis (XX') are smaller than the heights ($h_I$) of the axially inner sidewalls of the same grooves, the difference ($h_I-h_E$) being between 0.05 and 0.50 times the axially inner height ($h_I$).

11. A tire with a radial carcass reinforcement surmounted by a crown reinforcement, intended to equip medium and high tonnage transport vehicles travelling long distances at sustained speed to be inflated at a pressure greater than 5 bars, comprising circumferential grooves (10, 11) so as to provide the tread with at least five ribs, which ribs can be provided with incisions of a width other than zero and less than 3 mm which are transverse and substantially parallel to each other, spaced circumferentially by a pitch of between 0.005 and 0.013 times the circumferential length of the tire measured in the equatorial plane, wherein at least the ribs (20) defined by two circumferential grooves are provided with incisions (30) debouching on the two grooves, all such incisions in the tread being inclined in the same direction by an angle α of between 5° and 25° with respect to the direction perpendicular (P) to the tread, the direction being such that the resultant force (F) exerted upon travel on the ellipse of contact by the ground on the tread (1) tends to straighten the incisions (30) towards a zero inclination with respect to said perpendicular (P) to the tread (1), the tread having in its axial portion, contained between the two axially outermost grooves, a transverse radius of curvature ($R_T$) at least equal to 50% of the equatorial radius of curvature ($R_E$) of the tire mounted on its nominal operating rim and inflated to the recommended pressure, and wherein the transverse incisions define, with the circumferential grooves, elements in relief (31), the height ($h_F$) of the wall (301) of each element in relief (31) located on the trailing-edge (FU) side of the element is greater than the height ($h_A$) of the wall (302) of the circumferentially adjacent element in relief located on the leading-edge side of the adjacent element, these two heights being measured parallel to the direction of the incisions and the difference ($h_F-h_A$) being at most equal to 25% of the height ($h_A$).

12. A tire according to claim 11, which comprises at most two circumferential wide grooves (10) and a plurality of circumferential narrow grooves (11), the width ($l_1$) of any wide grooves being greater than 1.7 times the square root of the height ($h_1$) of the largest wall of a groove (10) and the width ($l_2$) of a narrow groove being less than 1.2 times the square root of the height ($h_2$) of the largest wall of the groove (11).

13. A tire according to claim 12, in which the tread has two wide grooves (10) axially spaced apart by a width ($L_3$) at most equal to 0.45 L, L being the width of the tread (1), and located symmetrically on opposite sides of the equatorial line (XX').

* * * * *

UNITED STATES PATENT AND TRADEMARK OFFICE
CERTIFICATE OF CORRECTION

PATENT NO. : 5,896,905
DATED : April 27, 1999
INVENTOR(S) : Patrick Lurois

It is certified that error appears in the above-identified patent and that said Letters Patent is hereby corrected as shown below:

Col. 9, line 31: "claim 1," should read -- claim 7, --;

Col. 9, line 51: "claim 1," should read -- claim 7, --;

Col. 2, line 41: "axle the" should read -- axle, the --;

Signed and Sealed this

Seventeenth Day of October, 2000

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,896,905
DATED : April 27, 1999
INVENTOR(S) :
Patrick Lurois

It is certified that error appears in the above-identified patent and that said Letters Patent is hereby corrected as shown below:

[73] Assignee: "Compagnie Generale Des Establissements. Michelin, France" should read -- Compagnie Generale Des Etablissements Michelin. Clermont-Ferrand Cedex, France --

Signed and Sealed this

First Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,896,905  
DATED : April 27, 1999  
INVENTOR(S) : Patrick Lurois

Page 1 of 1

It is certified that error appears in the above-identified patent and that said Letters Patent is hereby corrected as shown below:

Title page, Item [73] should read as follows:

-- [73] Assignee: " Compagnie Generale Des Establissements. Michelin, France' should read -- Compagnie Generale Des Establissements Michelin. Clermont-Fererand Cedex, France --.

Signed and Sealed this

Eighteenth Day of September, 2001

Attest:

Attesting Officer

NICHOLAS P. GODICI
Acting Director of the United States Patent and Trademark Office

UNITED STATES PATENT AND TRADEMARK OFFICE
CERTIFICATE OF CORRECTION

PATENT NO. : 5,896,905
DATED : April 27, 1999
INVENTOR(S) : Patrick Lurois

It is certified that error appears in the above-identified patent and that said Letters Patent is hereby corrected as shown below:

This certificate supersedes Certificate of Correction issued September 18, 2001. The certificate was issued in error and should be vacated.

Signed and Sealed this

Twenty-fourth Day of December, 2002

JAMES E. ROGAN
*Director of the United States Patent and Trademark Office*